US012377648B2

(12) United States Patent
Lee et al.

(10) Patent No.: US 12,377,648 B2
(45) Date of Patent: Aug. 5, 2025

(54) PAD PRINTING DEVICE AND WINDOW PRINTING METHOD USING THE SAME

(71) Applicant: Samsung Display Co., Ltd., Yongin-si (KR)

(72) Inventors: Kyoungin Lee, Yongin-si (KR); Junyoung Kim, Yongin-si (KR); Kyongbin Jin, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 63 days.

(21) Appl. No.: 18/144,072

(22) Filed: May 5, 2023

(65) Prior Publication Data

US 2024/0009991 A1 Jan. 11, 2024

(30) Foreign Application Priority Data

Jul. 8, 2022 (KR) ........................ 10-2022-0084202

(51) Int. Cl.
*B41F 17/00* (2006.01)
*B41M 5/00* (2006.01)

(52) U.S. Cl.
CPC .......... *B41F 17/001* (2013.01); *B41F 17/006* (2013.01); *B41M 5/0041* (2013.01)

(58) Field of Classification Search
None
See application file for complete search history.

(56) References Cited

U.S. PATENT DOCUMENTS 5,921,177 A * 7/1999 Shin ...................... B41F 17/001 101/41
6,418,843 B1 * 7/2002 Givler ................... B41F 17/001 101/35

FOREIGN PATENT DOCUMENTS

KR 10-1773426 B1 8/2017

* cited by examiner

*Primary Examiner* — Binu Thomas
(74) *Attorney, Agent, or Firm* — Womble Bond Dickinson (US) LLP

(57) ABSTRACT

A pad printing device includes: a jig body having a jig recess in an upper surface thereof; a pad on the jig body; and a plurality of guide pins on side portions of the jig body. The jig recess is configured to accommodate a window, and the guide pins are configured to reciprocate toward the jig recess.

20 Claims, 12 Drawing Sheets

PAD PRINTING DEVICE AND WINDOW PRINTING METHOD USING THE SAME

CROSS-REFERENCE TO RELATED APPLICATION

This application claims priority to and the benefit of Korean Patent Application No. 10-2022-0084202, filed on Jul. 8, 2022, in the Korean Intellectual Property Office, the entire disclosure of which is incorporated herein by reference.

BACKGROUND

1. Field

Aspects of embodiments of the present disclosure relate to a pad printing device and a window printing method using the same.

2. Description of the Related Art

A display device that provides an image to a user includes a display panel that displays (e.g., configured to display) the image and a window disposed on the display panel. The window protects the display panel from external impacts and scratches. The window also provides a front surface of the display device and directly affects the design of the display device.

Accordingly, various patterns may be formed on the window not only to protect the display panel but also to add various designs to the display device. For example, a pattern having a color (e.g., a predetermined color) may be formed on (or along) a periphery of the window by transferring ink to the periphery of the window by using a printing pad.

To reduce a defect rate of a window manufacturing process and to print a clear pattern on a window, a pad printing method is being developed.

SUMMARY

Embodiments of the present disclosure provide a pad printing device for transferring ink to edge portions of a window such that the ink is not provided to guide pins.

According to an embodiment, a pad printing device includes a jig body, a pad on the jig body, and a plurality of guide pins on side surfaces of the jig body. The jig body has a jig recess defined in an upper surface thereof and configured to accommodate a window. The guide pins are configured to reciprocate toward the jig recess.

According to another embodiment, a window printing method includes: placing a window in a jig recess defined in a jig body, the window having a flat portion and edge portions that extend from opposite sides of the flat portion and have a curved surface; bringing a plurality of guide pins into contact with one of the edge portions, the plurality of guide pins being arranged on side surfaces of the jig body to reciprocate toward the jig recess; fixing the window by applying a vacuum to a vacuum absorption hole, the vacuum absorption hole being defined in a portion of the jig body having the jig recess defined therein; spacing the guide pins apart from the one edge portion; and providing ink to the edge portions.

BRIEF DESCRIPTION OF THE DRAWINGS

The above and other aspects and features of the present disclosure will become apparent by describing, in detail, embodiments thereof with reference to the accompanying drawings.

DETAILED DESCRIPTION

Figure 1:
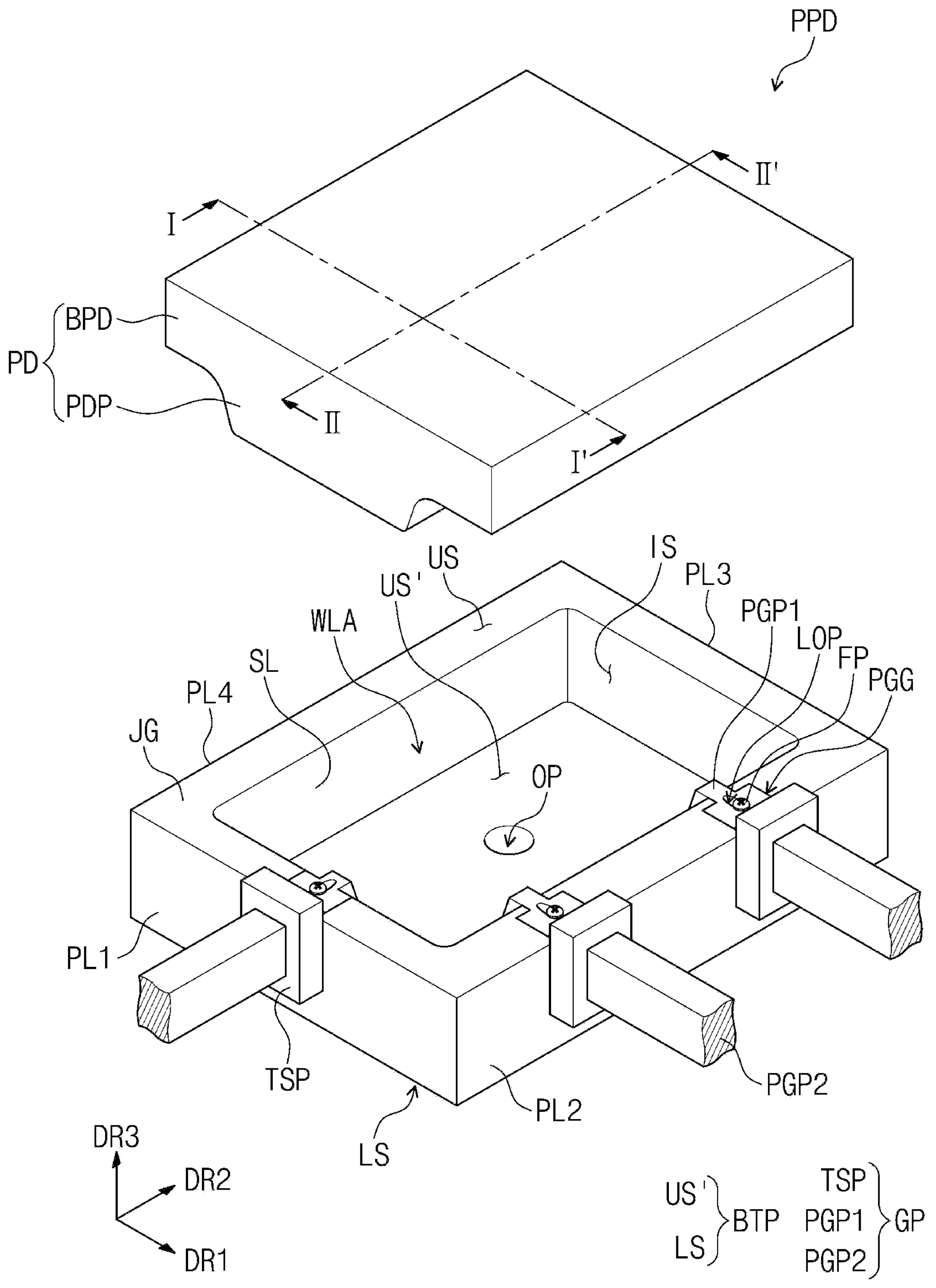
FIG. 1 is a perspective view of a pad printing device according to an embodiment of the present disclosure.

The above and other aspects and features of the present disclosure will become apparent from the following description of embodiments given in conjunction with the accompanying drawings. However, the present disclosure is not limited to the embodiments disclosed herein and may be implemented in various different forms. The embodiments described herein are intended to provide a complete disclosure of the present disclosure and to provide thorough understanding of the present disclosure to those skilled in the art to which the present disclosure pertains. The scope of the present disclosure should be limited only by the accompanying claims and their equivalents.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of," when preceding a list of elements, modify the entire list of elements and do not modify the individual elements of the list. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Embodiments described herein will be described with reference to plan views and sectional views, which are ideal schematic views of the present disclosure. Accordingly, the forms of the illustrative drawings may be changed according to manufacturing technology and/or allowable errors (e.g., manufacturing tolerances). Accordingly, embodiments of the present disclosure are not limited to the specific forms illustrated herein but include changes in the forms generated according to manufacturing processes. Regions illustrated in the drawings have schematic properties, and the shapes of the regions illustrated in the drawings illustrate specific forms of regions of devices and are not intended to limit the scope of the present disclosure.

Hereinafter, embodiments of the present disclosure will be described in more detail with reference to the accompanying drawings.

Figure 2:
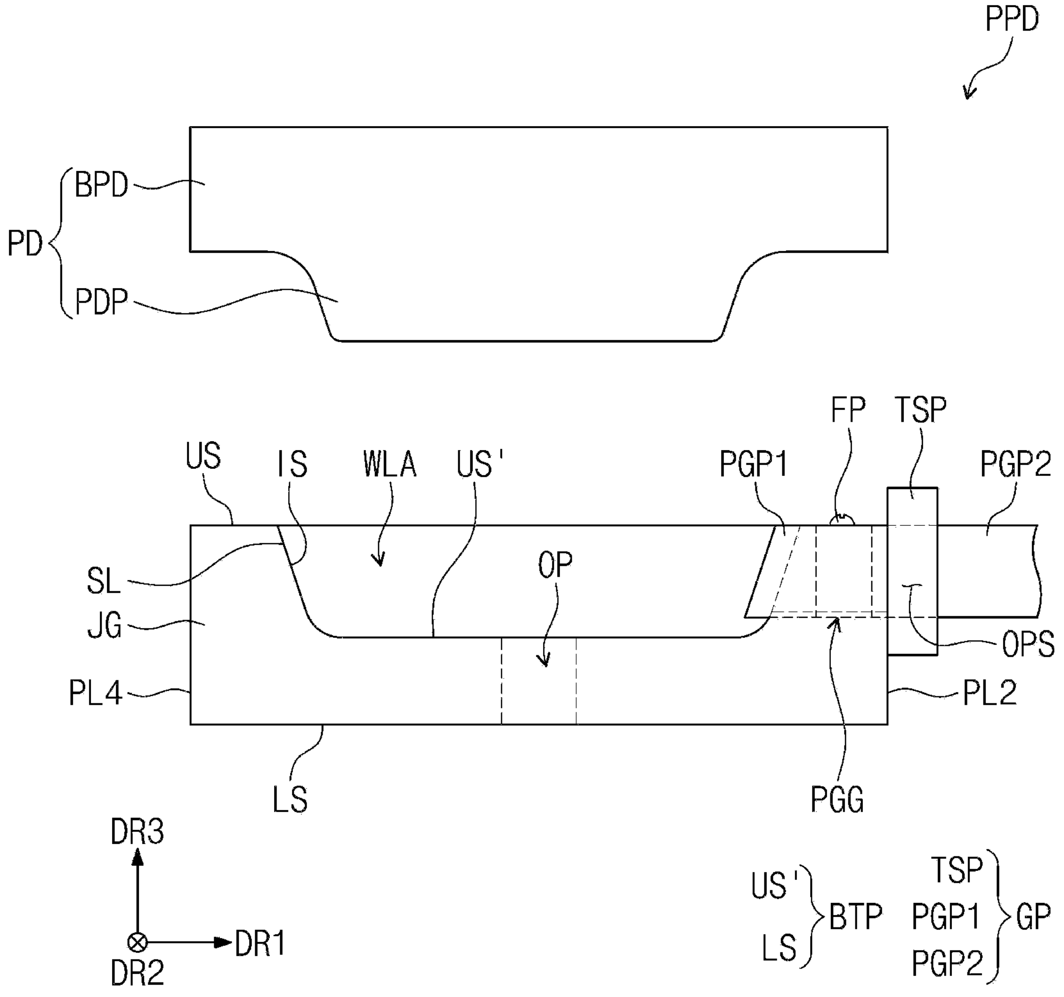
FIG. 2 is a sectional view taken along the line I-I' in FIG. 1.
Figure 3:
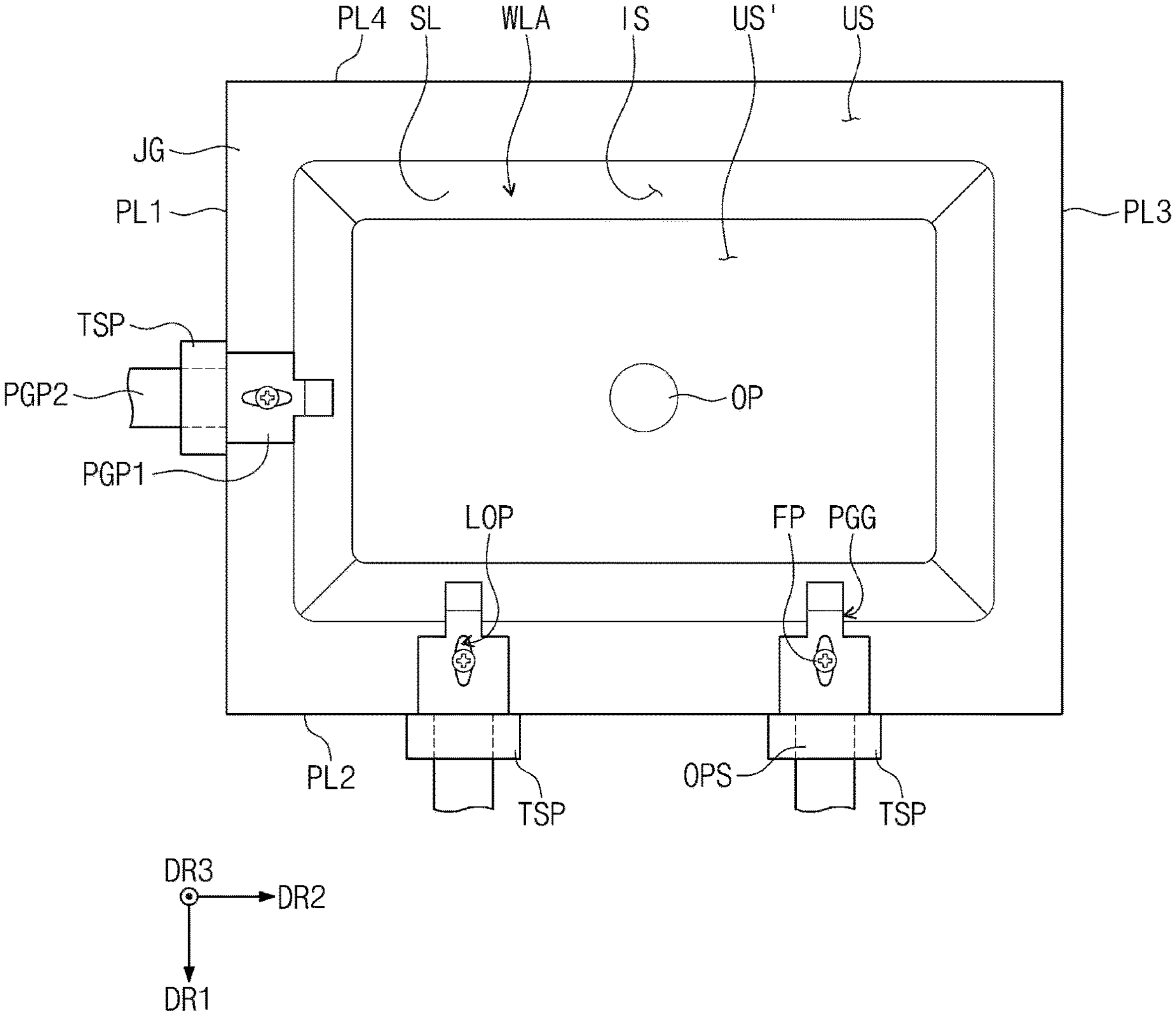
FIG. 3 is a plan view of a jig body as viewed in a third direction.

FIG. 1 is a perspective view of a pad printing device according to an embodiment of the present disclosure, FIG. 2 is a sectional view taken along the line I-I' in FIG. 1, and FIG. 3 is a plan view of a jig body as viewed in a third direction.

Referring to FIGS. 1, 2, and 3, the pad printing device PPD may include a jig body JG, a pad PD, and a plurality of guide pins GP. The pad PD may be disposed on the jig body JG, and the guide pins GP may be disposed on side surfaces of the jig body JG.

The jig body JG may have a lower surface LS defined by (e.g., along a plane defined by) a first direction DR1 and a second direction DR2 crossing the first direction DR1 and an upper surface US defined as a surface facing away from the lower surface LS in a third direction DR3. The third direction DR3 may be defined as a direction extending perpendicular to a plane defined by the first and second directions DR1 and DR2. As used herein, the expression "when viewed on the plane" may mean that it is viewed in the third direction DR3.

The lower surface LS and the upper surface US of the jig body JG may be parallel to each other. The jig body JG may have a first surface PL1, a second surface PL2, a third surface PL3, and a fourth surface PL4 that are vertically connected to (e.g., vertically extend between) the lower surface LS and the upper surface US and that define the side surfaces of the jig body JG. The first surface PL1, the second surface PL2, the third surface PL3, and the fourth surface PL4 may be disposed between the lower surface LS and the upper surface US. The first surface PL1, the second surface PL2, the third surface PL3, and the fourth surface PL4 may extend from the periphery of the lower surface LS to the periphery of the upper surface US. The first surface PL1, the second surface PL2, the third surface PL3, and the fourth surface PL4 may define outside surfaces of the jig body JG that face toward the outside.

A jig recess WLA may be defined in the upper surface US of the jig body JG. The jig recess WLA may be defined by a bottom portion BTP and sidewall portions SL of the jig body JG. The bottom portion BTP of the jig recess WLA may be parallel to the plane defined by the first direction DR1 and the second direction DR2.

A vacuum absorption hole (e.g., a vacuum absorption opening) OP may be defined in the bottom portion BTP. The vacuum absorption hole OP may fix a window WD to be described below to the jig recess WLA.

The first surface PL1, the second surface PL2, the third surface PL3, and the fourth surface PL4 may define outside surfaces of the sidewall portions SL. An upper surface US' of the bottom portion BTP and the lower surface LS thereof may each have a flat surface defined by the first and second directions DR1 and DR2. The upper surface US' of the bottom portion BTP may be located lower than the upper surface US in the third direction DR3.

Hereinafter, surfaces of the sidewall portions SL that face each other in the first direction DR1 and the second direction DR2 are defined as inside surfaces IS of the sidewall portions SL. The jig recess WLA may be substantially defined by the upper surface US' and the inside surfaces IS.

The sidewall portions SL may surround (e.g., surround in a plan view or extend around a periphery of) the bottom portion BTP. The sidewall portions SL may extend upwardly from the periphery of the bottom portion BTP. The inside surfaces IS of the sidewall portions SL that face each other may form an obtuse angle with the bottom portion BTP. For example, the inside surfaces IS of the sidewall portions SL may extend to form an obtuse angle with the upper surface US' of the bottom portion BTP. Accordingly, the inside surfaces IS of the sidewall portions SL may be inclined with respect to the bottom portion BTP. The boundary between the inside surfaces IS of the sidewall portions SL and the bottom portion BTP may have a curved shape. The sidewall portions SL may form a frame shape. The window WD, to be described below, may be disposed in the jig recess WLA defined by the sidewall portions SL and the bottom portion BTP.

Guide recesses PGG may be defined in upper surfaces of the sidewall portions SL. The guide recesses PGG may extend from the sidewall portions SL, by which the jig recess WLA is formed, to the upper surface US of the jig body JG. A plurality of guide recesses PGG may be provided.

The first surface PL1 and the third surface PL3 may be flat surfaces defined by (e.g., extending primarily in) the first direction DR1 and the third direction DR3 crossing (e.g., perpendicular to) the first direction DR1. The first surface PL1 and the third surface PL3 may be disposed to face away from each other and may be parallel to each other. The second surface PL2 and the fourth surface PL4 may be flat surfaces defined by (e.g., extending primarily in) the second direction DR2 and the third direction DR3. The second surface PL2 and the fourth surface PL4 may be disposed to face away from each other and may be parallel to each other.

The guide pins GP may be disposed on the first surface PL1 and the second surface PL2. Each of the guide pins GP may include a support part TSP, a first portion PGP1, and a second portion PGP2.

A configuration of the guide pin GP disposed on the first surface PL1 will be described as follows. The first portion PGP1 may be disposed in a corresponding guide recess PGG from among the guide recesses PGG. For example, the first portion PGP1 may be disposed in the guide recess PGG defined in the sidewall portion SL having the first surface PL1 as the outside surface.

The first portion PGP1 may protrude further into the jig recess WLA than the inside surface IS of the sidewall portion SL that faces away from the first surface PL1. The guide pin GP may reciprocate along the guide recess PGG. A long hole (e.g., an elongated opening) LOP may be defined in an upper surface of the first portion PGP1. A fixing screw FP for coupling the first portion PGP1 to the jig body JG may be disposed in the long hole LOP. Detailed descriptions of the long hole LOP and the fixing screw FP will be given below with reference to FIG. 4.

The support part TSP may be disposed on the first surface PL1. The second portion PGP2 may be connected to the first portion PGP1 through the support part TSP. The support part TSP may be disposed on the first surface PL1 and may support the second portion PGP2. The second portion PGP2 may extend outwardly from the sidewall portion SL. The second portion PGP2 may reciprocate in the second direction DR2. The first portion PGP1 may be reciprocated toward the jig recess WLA along the guide recess PGG by the second portion PGP2. Detailed description thereabout will be given below with reference to FIG. 5.

Configurations of the guide pins GP disposed on the second surface PL2 will be described as follows. The guide pins GP may be arranged in (e.g., may be adjacent to each other in) the second direction DR2. The first portions PGP1 of the guide pins GP may be disposed in corresponding guide recess PGG from among the guide recesses PGG. For example, the first portions PGP1 may be disposed in the guide recesses PGG defined in the sidewall portion SL having the second surface PL2 as the outside surface.

Hereinafter, a configuration of any one guide pin GP disposed on the second surface PL2 will be described.

The configuration of the guide pin GP disposed on the second surface PL2 will be described as follows. The first portion PGP1 may be disposed in a corresponding guide recess PGG from among the guide recesses PGG. For example, the first portion PGP1 may be disposed in the guide recess PGG defined in the sidewall portion SL having the second surface PL2 as the outside surface. The first portion PGP1 may protrude further into the jig recess WLA than the inside surface IS of the sidewall portion SL that faces away from the second surface PL2. The guide pin GP may reciprocate along the guide recess PGG. A long hole (e.g., an elongated opening) LOP may be defined in an upper surface of the first portion PGP1. A fixing screw FP for coupling the first portion PGP1 to the jig body JG may be disposed in the long hole LOP. Detailed descriptions of the long hole LOP and the fixing screw FP will be given below with reference to FIG. 4.

The support part TSP may be disposed on the second surface PL2. The second portion PGP2 may be connected to the first portion PGP1 through the support part TSP. The support part TSP may be disposed on the second surface PL2 and may support the second portion PGP2. The second portion PGP2 may extend outwardly from the sidewall portion SL. The second portion PGP2 may reciprocate in the first direction DR1. The first portion PGP1 may be reciprocated toward the jig recess WLA along the guide recess PGG by the second portion PGP2. Detailed description thereabout will be given below with reference to FIG. 5.

The pad PD may include a body portion BPD and a pad portion PDP. An upper surface of the body portion PBD may have a flat surface defined by (e.g., defined along the plane formed by) the first direction DR1 and the second direction DR2. The pad portion PDP may protrude downwardly from the body portion PBD and may have a curved shape. The pad PD may include an elastic body. For example, the pad PD may include at least one of silicone and rubber.

The pad PD may move toward the jig body JG in the third direction DR3. As the pad PD moves in the third direction DR3, the body portion BPD may be disposed on (e.g., may contact) the upper surface US of the jig body JG, and the pad portion PDP may be disposed in (e.g., may fill) the jig recess WLA. A lower surface of the pad portion PDP may have a shape corresponding to the upper surface US' of the bottom portion BTP and the inside surfaces IS that define the jig recess WLA.

Figure 4:
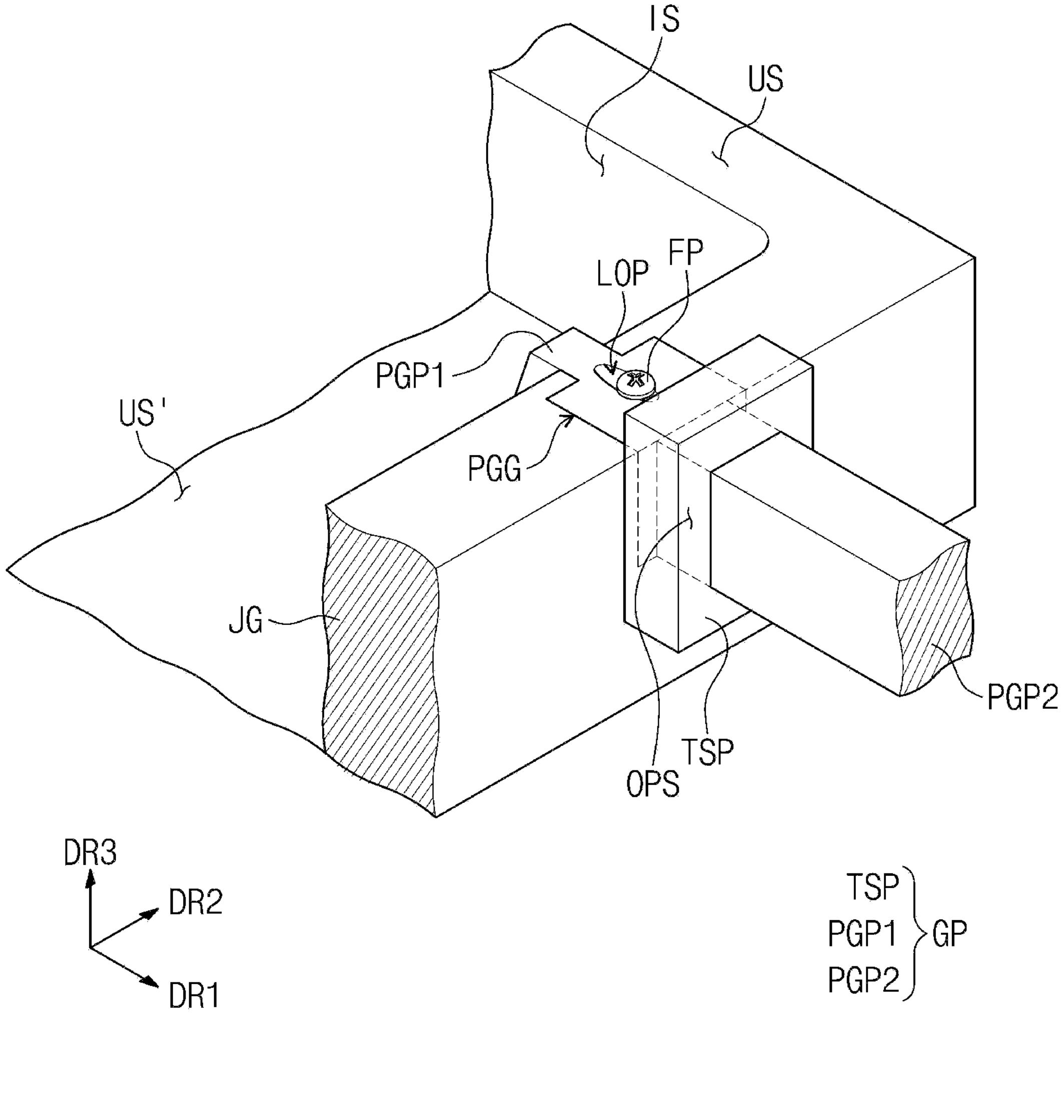
FIG. 4 is an expanded perspective view of any one guide pin disposed on a second surface illustrated in FIG. 1.

FIG. 4 is an expanded perspective view of any one of the guide pins disposed on the second surface illustrated in FIG. 1.

Referring to FIG. 4, a long hole (e.g., an elongated opening) LOP may be defined in the upper surface of the first portion PGP1. The long hole LOP may have a shape in which the diameter (e.g., a length or dimension) extending in the first direction DR1 is longer than the diameter (e.g., a length or dimension) extending in the second direction DR2.

A fixing screw FP may be disposed in (e.g., may extend through) the long hole LOP. The fixing screw FP may allow the guide pin GP to reciprocate without being separated from the jig body JG. For example, the first portion PGP1 may move in the first direction DR1 toward the jig recess WLA with respect to the fixing screw FP. Furthermore, the first portion PGP1 may move in a direction facing away from the jig recess WLA with respect to the fixing screw FP.

A connection opening OPS may be defined in the support part TSP. The first portion PGP1 may be disposed in the connection opening OPS. One side of the first portion PGP1 may be disposed in the jig recess WLA. An opposite side of the first portion PGP1 may be disposed in the connection opening OPS.

One side of the second portion PGP2 may be disposed in the connection opening OPS. An opposite side of the second portion PGP2 may be connected to a transfer unit. The opposite side of the first portion PGP1 and the one side of the second portion PGP2 may be connected in the connection opening OPS.

For example, the transfer unit may be connected to the second portion PGP2 of the guide pin GP and may reciprocate the second portion PGP2 in the first direction DR1. As the second portion PGP2 is reciprocated in the first direction DR1, the first portion PGP1 may reciprocate toward the jig recess WLA along the guide recess PGG. When the first portion PGP1 reciprocates, the long hole LOP may be reciprocated in the first direction DR1 with respect to the fixing screw FP, and when the fixing screw FP reaches an end portion of the long hole LOP in the first direction DR1, the first portion PGP1 may be stopped.

FIGS. 5A to 5G are views for describing steps of a window printing method using the pad printing device.

Figure 5A:
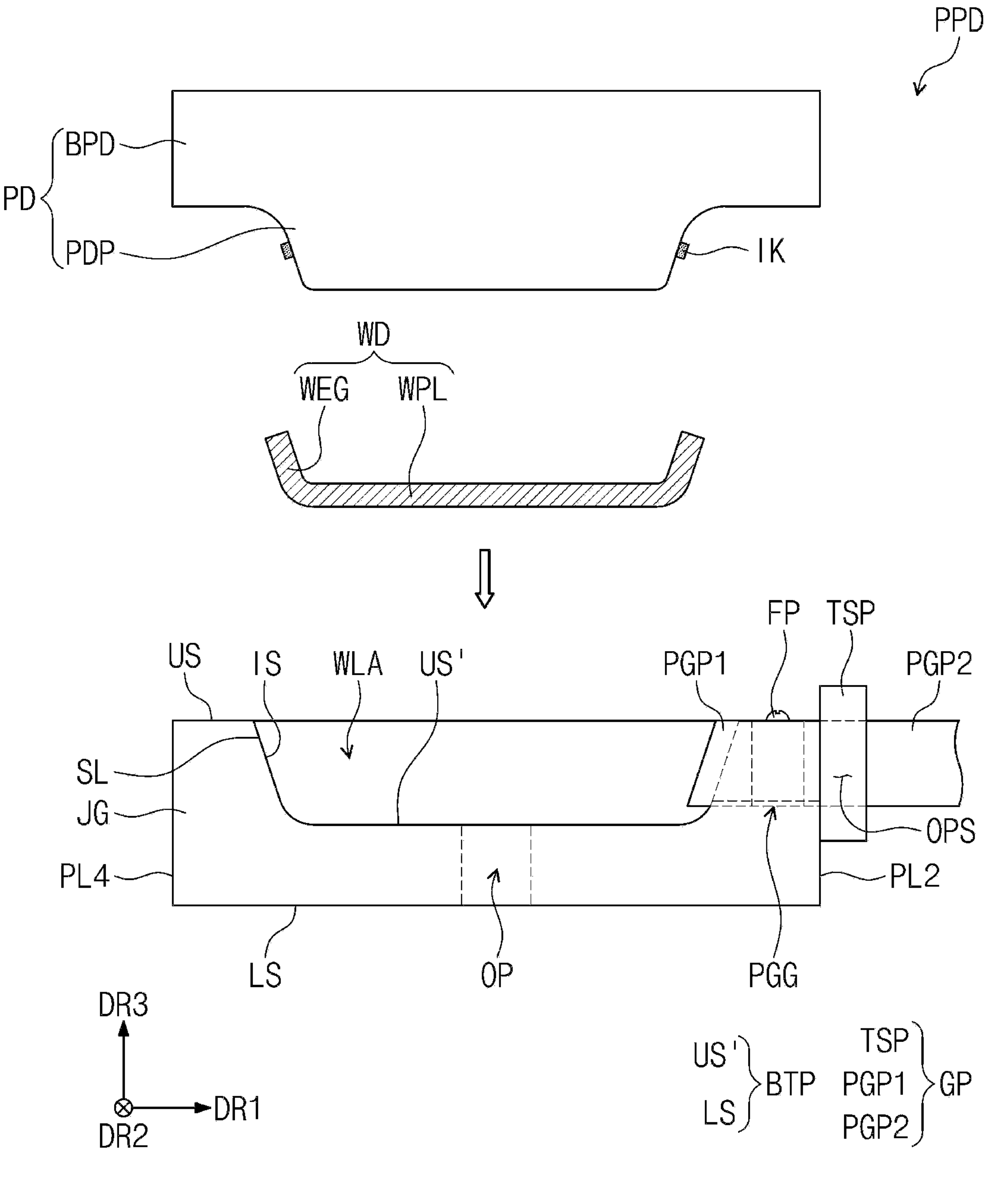
FIGS. 5A to 5G are views showing steps of a window printing method using the pad printing device.
Figure 5B:
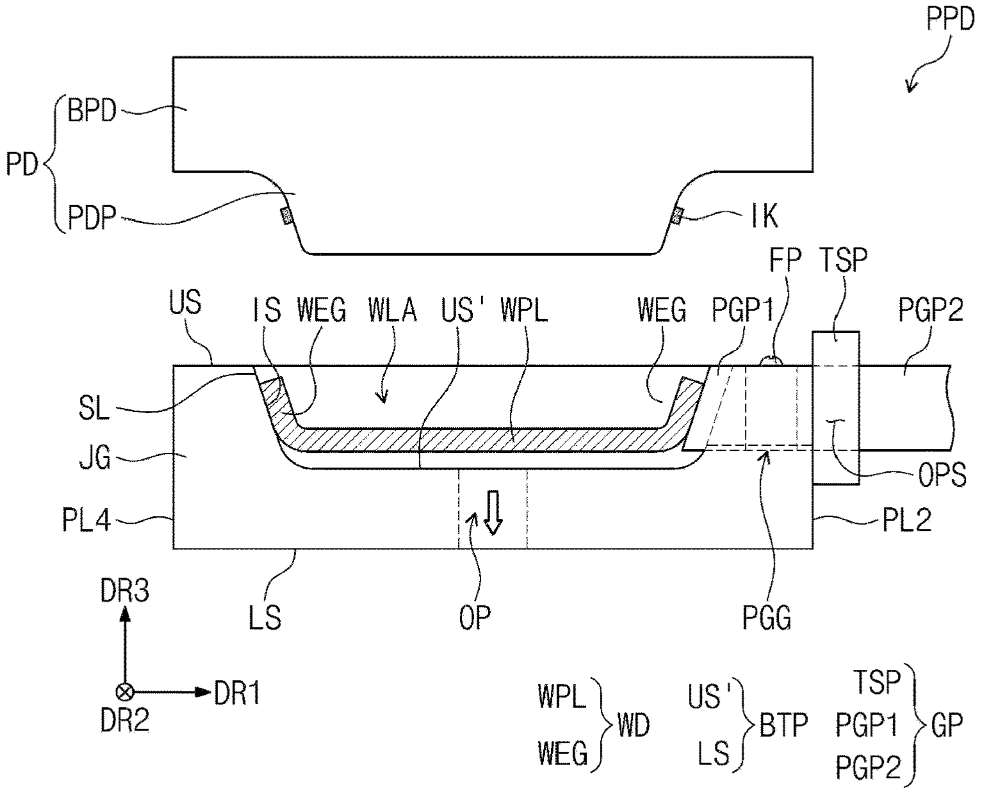
Figure 5C:
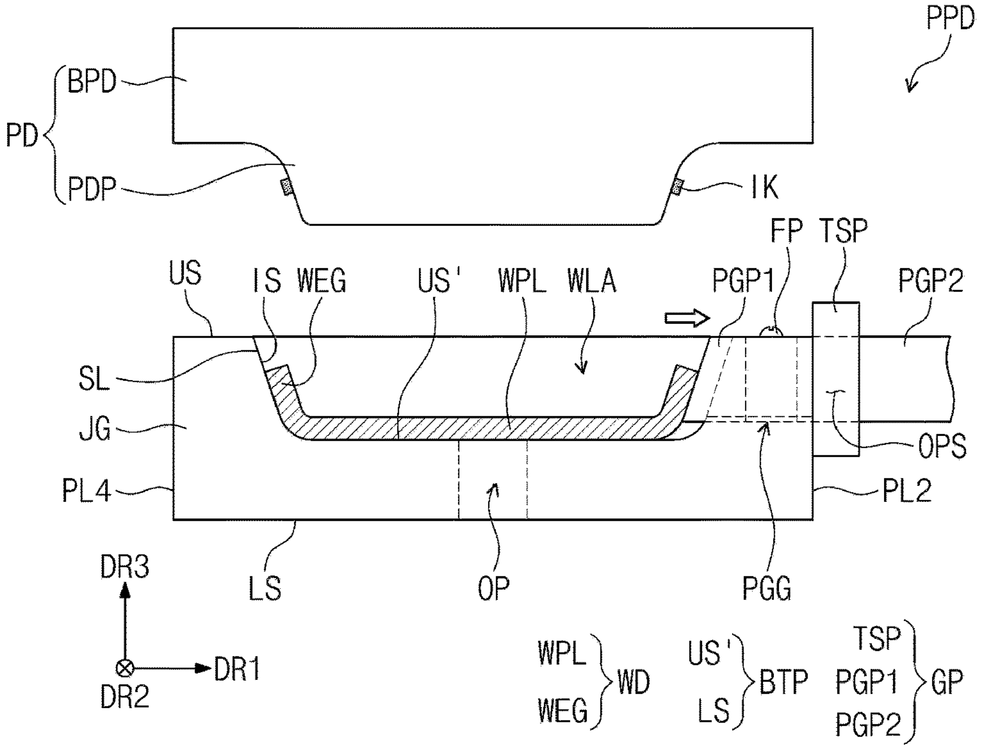
Figure 5D:
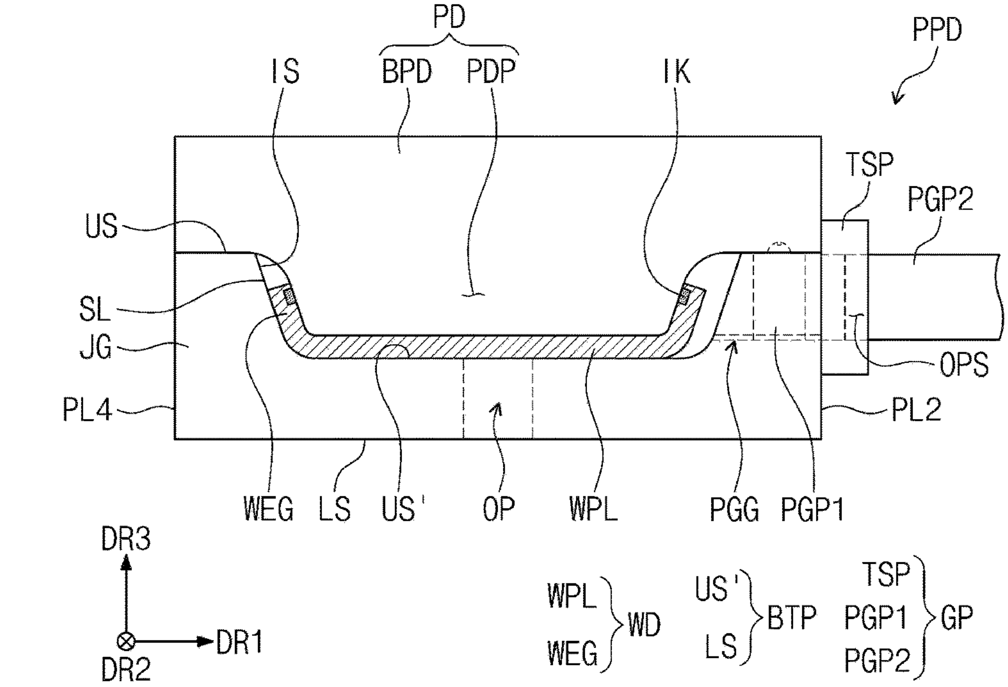
Figure 5E:
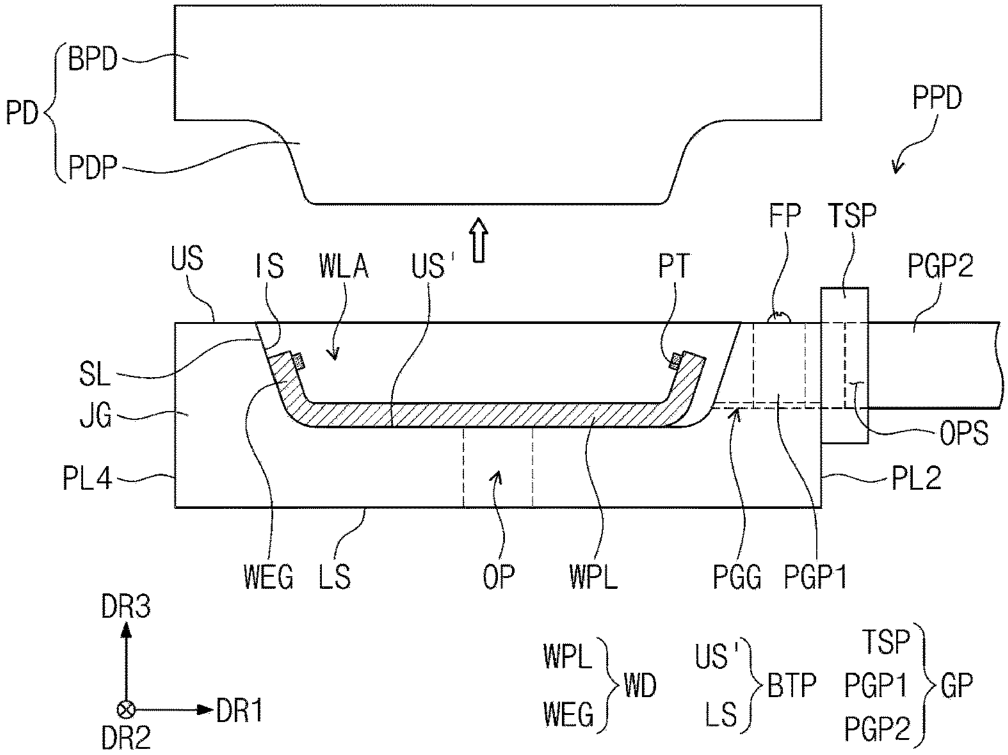
Figure 5F:
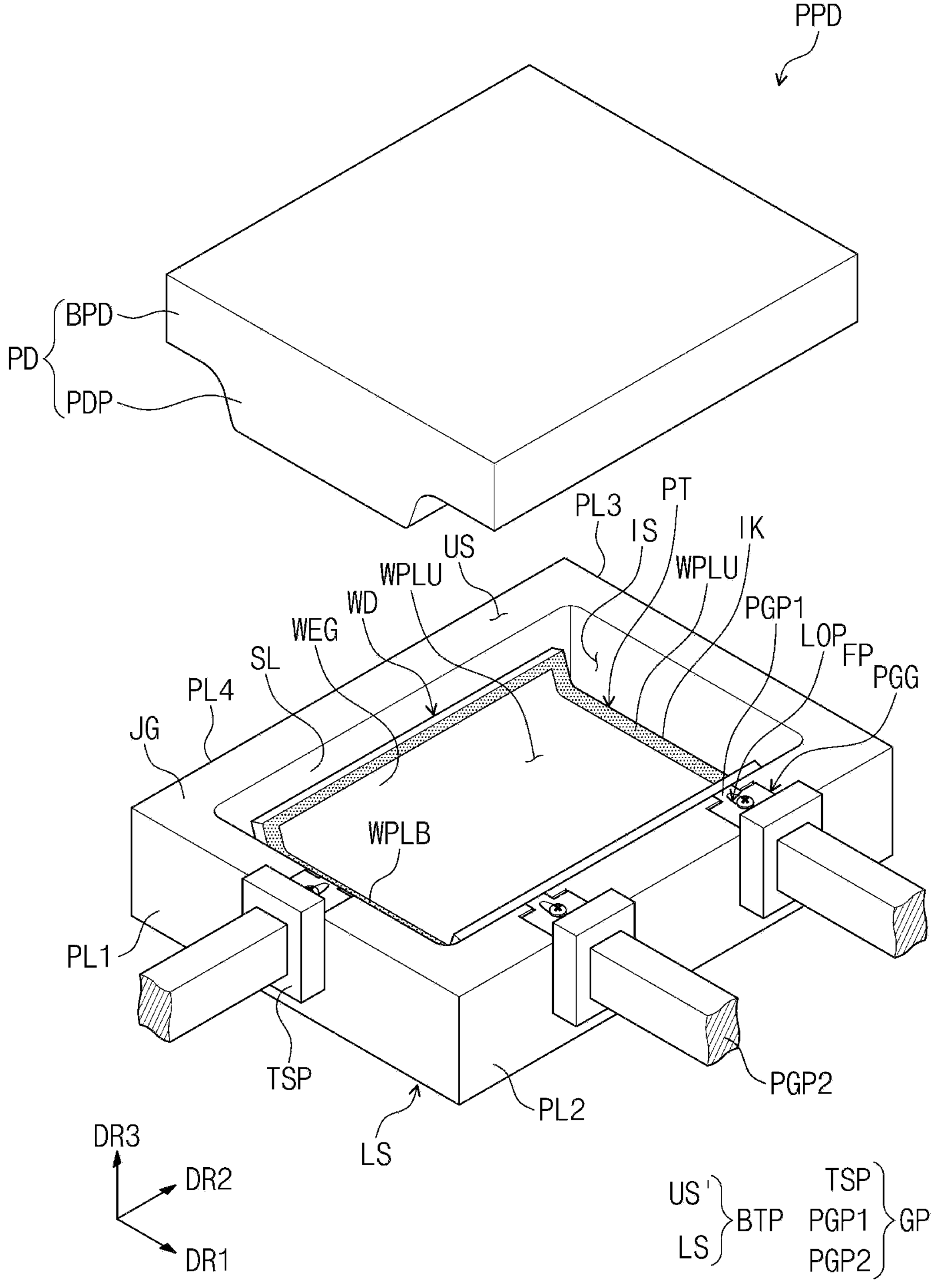

From among FIGS. 5A to 5G, the drawings other than FIG. 5F are sectional views taken along the line I-I' of FIG. 1.

The jig body JG, the guide pins GP, and the pad PD shown in FIGS. 5A to 5G are identical to the jig body JG, the guide pins GP, and the pad PD described with respect to FIGS. 1 to 4 and, therefore, will be described only briefly or descriptions thereabout will be omitted.

Referring to FIGS. 5A and 5B, the window WD may be prepared. The window WD may be disposed between the jig body JG and the pad PD. The window WD may be disposed between the jig recess WLA and the pad portion PDP.

The window WD may have a flat portion WPL and edge portions WEG. The edge portions WEG may face each other in the first direction DR1 and may be symmetrical to each other. The edge portions WEG may have a curved shape bent toward the inside.

The flat portion WPL may be disposed between the edge portions WEG. The edge portions WEG may extend from opposite sides of the flat portion WPL that are symmetrical to each other in the first direction DR1.

The window WD may be moved downwardly and may be disposed in the jig recess WLA defined in the jig body JG. The flat portion WPL of the window WD may be disposed over the upper surface US' of the bottom portion BTP. The flat portion WPL may be disposed over the vacuum absorption hole OP defined in the bottom portion BTP.

One of the edge portions WEG, which extend from the opposite sides of the flat portion WPL and have a curved surface, may be brought into contact with the sidewall portion SL of the jig recess WLA. The edge portion WEG, which is symmetrical to the edge portion WEG brought into contact with the sidewall portion SL in the first direction DR1, may make contact with the first portion PGP1 of the guide pin GP. Accordingly, the window WD may be disposed in the jig recess WLA.

Referring to FIG. 5C, when the vacuum absorption hole OP defined in the bottom portion BTP is changed to a vacuum state (e.g., when a vacuum is applied to the vacuum absorption hole OP), the flat portion WPL of the window WD may be fixed to the jig recess WLA. The flat portion WPL may make contact with the upper surface US' of the bottom portion BTP and may be fixed to the bottom portion BTP.

When the window WD is fixed to the bottom portion BTP by the vacuum absorption hole OP, the guide pin GP may move in the direction from the inside surface IS to the outside surface of the jig recess WLA (e.g., the guide pin GP may be retracted). For example, the guide pin GP may move in the first direction DR1. The transfer unit may be connected to the second portion PGP2, and when the window WD is fixed to the jig recess WLA by the vacuum absorption hole OP, the second portion PGP2 may be moved by the transfer unit. When the second portion PGP2 is moved, the first portion PGP1 may be disposed on the same plane as the inside surface IS of the sidewall portion SL. The guide pin GP may be spaced apart from the edge portion WEG of the window WD. The other edge portion WEG may make contact with the inside surface IS of the sidewall portion SL.

FIG. 5D is a view illustrating an operation of transferring, by the pad PD, ink IK to the window WD. The pad PD may move toward the jig body JG in the third direction DR3. As the pad PD moves toward the jig body JG, the body portion BPD may be disposed on the upper surface US of the jig body JG, and the pad portion PDP may be disposed on the upper surface US' of the window WD. Accordingly, the body portion BPD may make contact with the window WD and may press the window WD. The body portion BPD may make contact with surfaces of the edge portions WEG that have a concave shape. Based on the state illustrated in FIG. 5D, the upper surface of the window WD may be defined by concave surfaces of the edge portions WEG. Substantially, based on FIG. 5D, the upper surface of the window WD may be a surface attached to a display panel DP to be described below.

When the pad portion PDP is disposed on the upper surface of the window WD, the ink IK may be transferred to the edge portions WEG of the window WD and portions of WPLU and WPLB of the flat portion WPL, to be described with reference to FIG. 9. Hereinafter, the portions WPLU and WPLB of the flat portion WPL may be defined as the upper flat portion WPLU and the lower flat portion WPLB, respectively. When the ink IK is transferred to the window WD, the guide pin GP may be moved to the same plane as the inside surfaces IS of the sidewall portions SL, and the ink may not be transferred to the guide pin GP.

Because the ink IK is not transferred to the guide pin GP, the ink IK may not adhere to a new window WD (e.g., a next window WD) in a process in which the processed window WD is removed and the new window WD is disposed in the jig recess WLA. Due to this, a separate process for removing the ink IK adhering to a portion other than a necessary portion (e.g., a cleaning process) may not be required. In addition, a defect in the window WD due to the ink IK adhering to the portion other than the necessary portion may be reduced.

Referring to FIG. 5E, patterns PT may be formed on the edge portions WEG when the ink IK is provided to the edge portions WEG of the window WD in the state in which the body portion BPD makes contact with the window WD. Accordingly, the ink IK having a color (e.g., a predetermined color) may be transferred to the edge portions WEG, and the edge portions WEG may be printed with the predetermined color.

FIG. 5F is a perspective view of FIG. 5E. The ink IK may be provided not only to the edge portions WEG of the window WD but also to the upper flat portion WPLU and the lower flat portion WPLB, which are symmetrical to each other in the second direction DR2. The patterns PT may also be formed on the upper flat portion WPLU and the lower flat portion WPLB. Accordingly, the upper flat portion WPLU and the lower flat portion WPLB may be printed with the color.

Figure 5G:
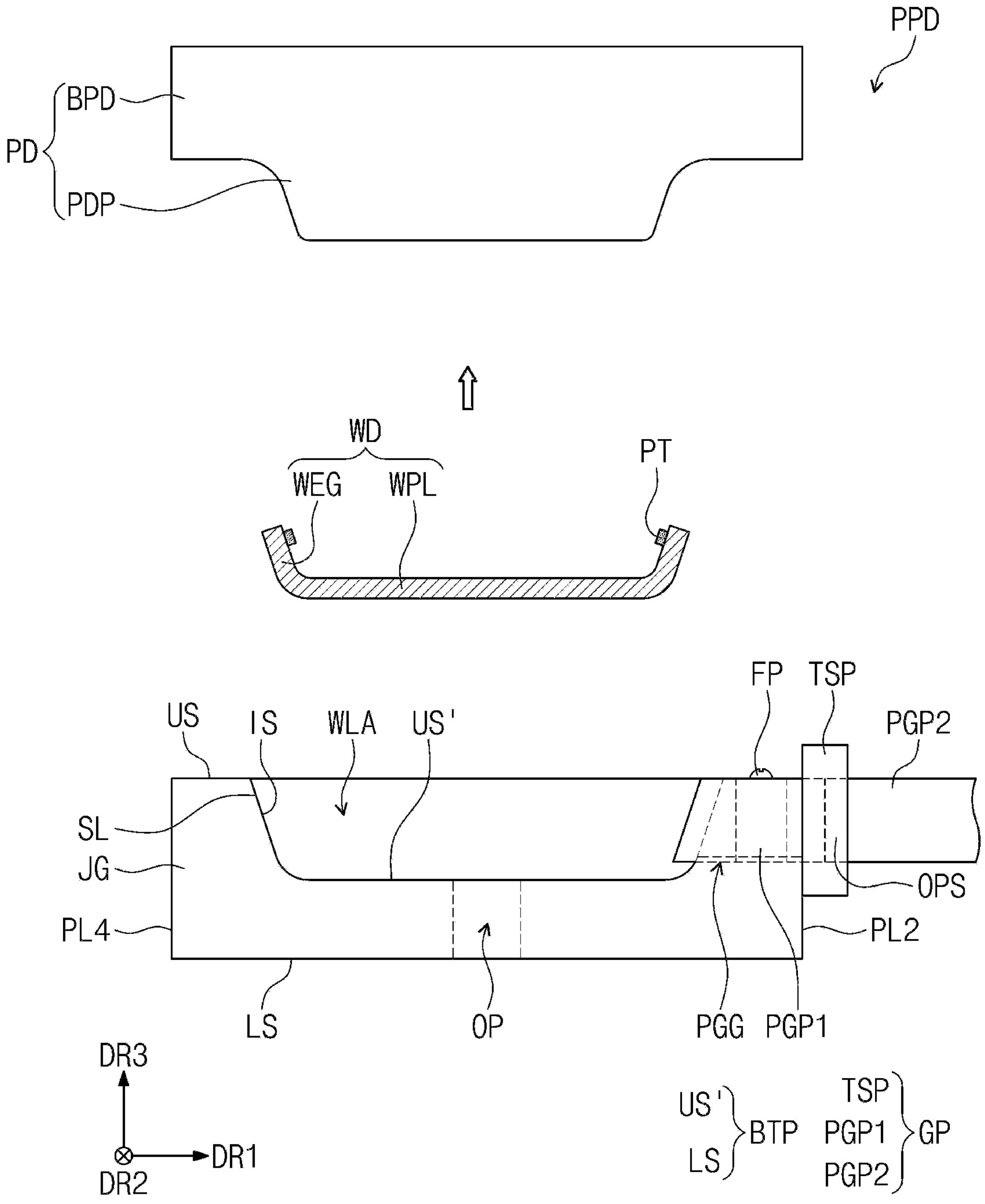

Referring to FIG. 5G, when the pad PD is separated, the vacuum absorption hole OP may release the vacuum state. When the vacuum state is released, the window WD may be separated from (e.g., may be separable from) the bottom portion BTP. At this time, the first portion PGP1 of the guide pin GP may move toward the jig recess WLA. The first portion PGP1 may protrude inwardly from the sidewall portion SL.

Figure 6A:
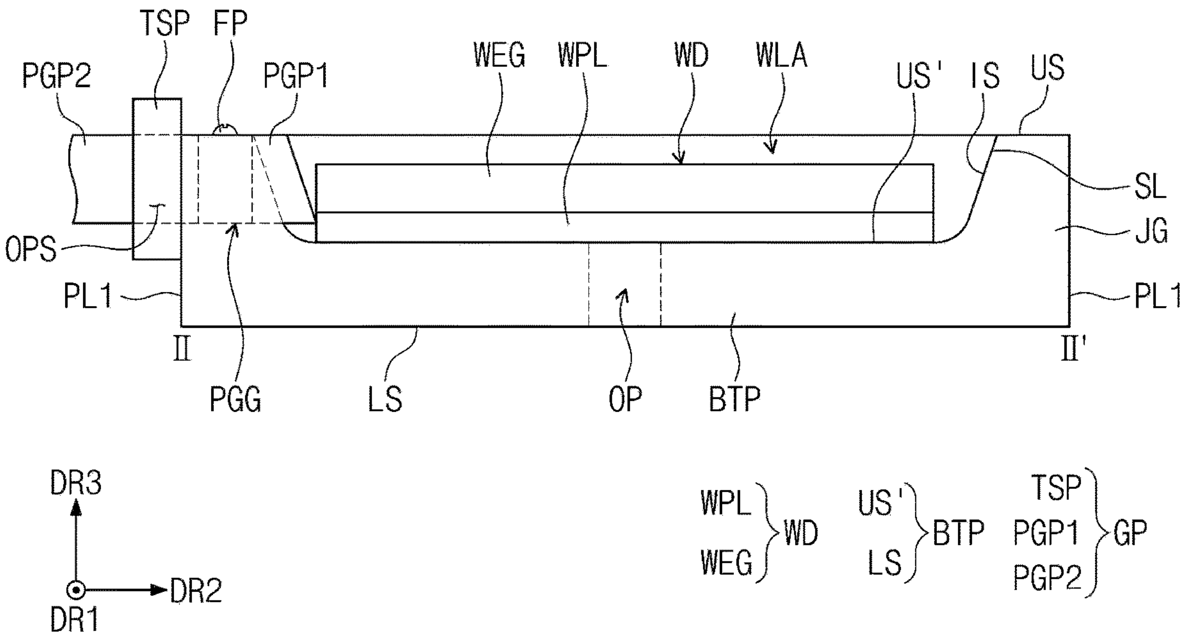
FIGS. 6A and 6B are views taken along the line II-II' in FIG. 1 showing steps of the window printing method using the pad printing device.
Figure 6B:
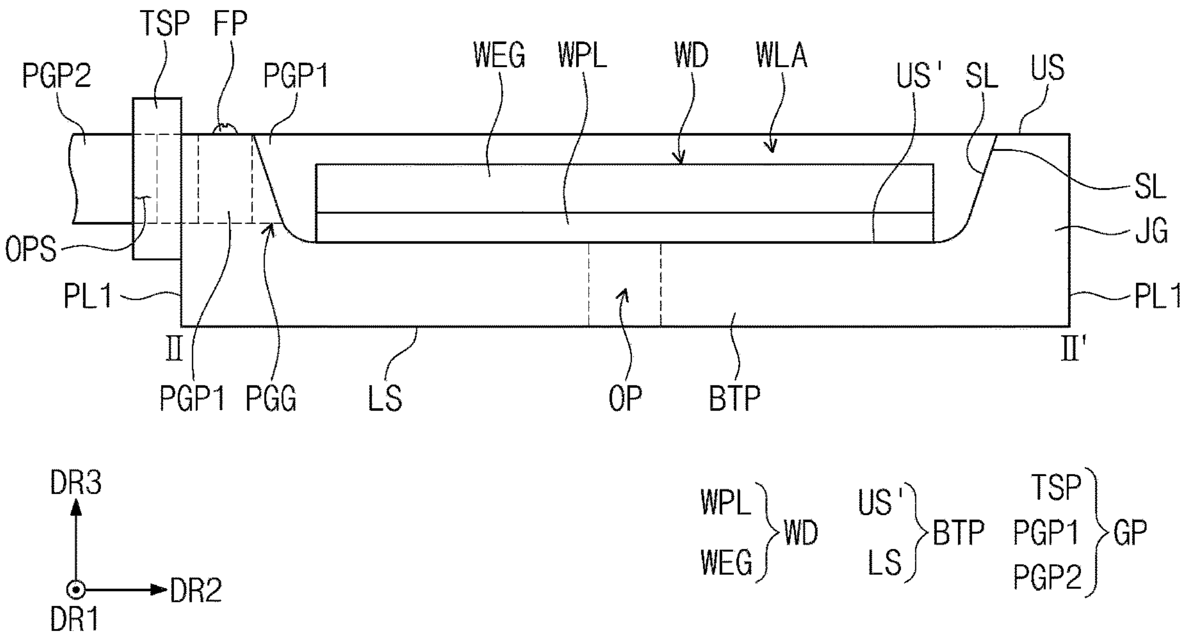

FIGS. 6A and 6B are views for describing steps of the window printing method using the pad printing device.

FIGS. 6A and 6B are sectional views of the guide pin GP disposed on the first surface PL1 taken along the line II-II' in FIG. 1. When the window WD is disposed in the jig recess WLA, the guide pin GP disposed on the first surface PL1 may also protrude toward the jig recess WLA to make contact with a side surface of the window WD and fix the window WD in the second direction DR2. Thereafter, when the window WD is fixed to the bottom portion BTP by the vacuum absorption hole OP, the guide pin GP may be moved from the jig recess WLA to the inside surface IS of the sidewall portion SL and may be spaced apart from the side surface of the window WD.

Figure 7:
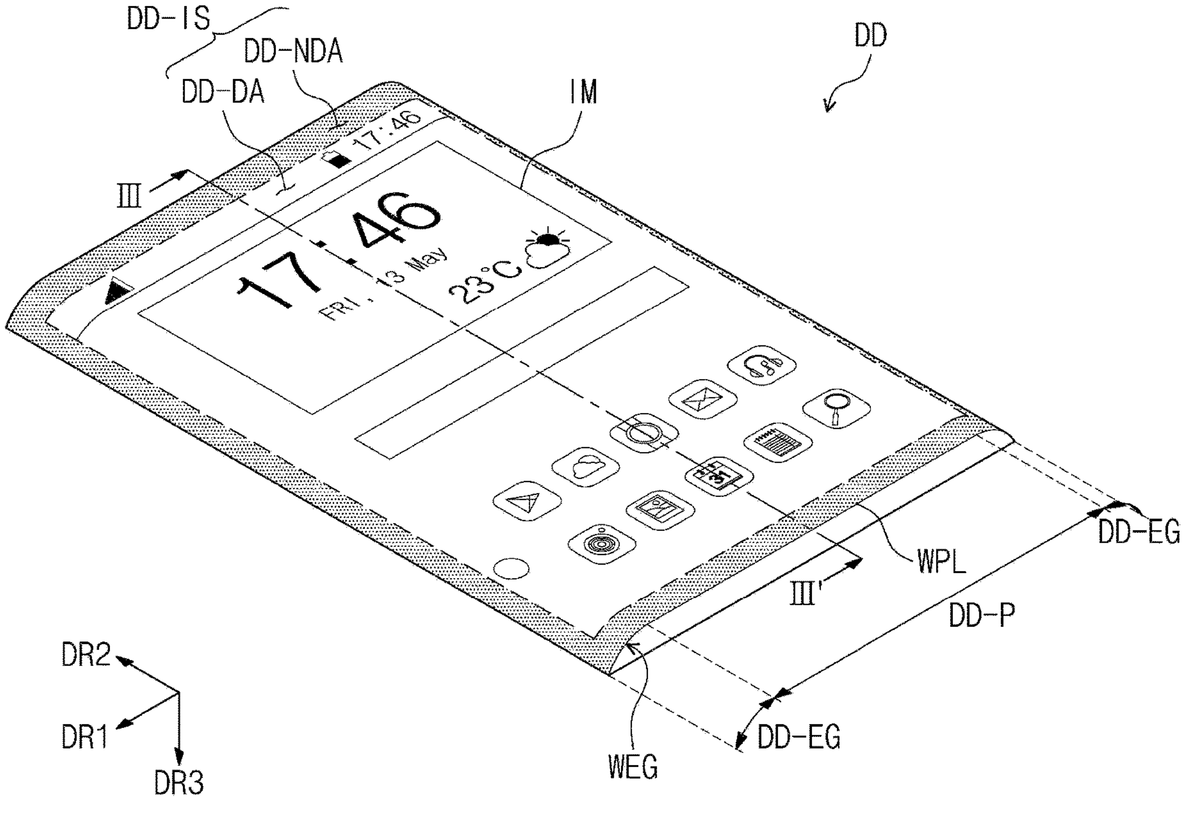
FIG. 7 is a perspective view of a display device including a window manufactured by the window printing method described with respect to FIGS. 5A to 5G and 6A and 6B.

FIG. 7 is a perspective view of a display device including the window manufactured by the window printing method described with respect to FIGS. 5A to 5G and 6A and 6B.

Referring to FIG. 7, the display device DD may display (e.g., may be configured to display) an image IM at a display surface DD-IS. The display surface DD-IS may be divided into different areas depending on whether the image IM is displayed or not. The display surface DD-IS may have a display area DD-DA on which the image IM is displayed and a non-display area DD-NDA adjacent to the display area DD-DA. The non-display area DD-NDA may surround (e.g., may surround in a plan view or may extend around a periphery of) the display area DD-DA. However, the shape of the display area DD-DA and the shape of the non-display area DD-NDA may be relatively designed without being limited to any particular design. For example, the non-display area DD-NDA may be disposed only in areas facing each other in the second direction DR2.

The display surface DD-IS may be divided into different areas depending on the direction in which the image IM is displayed. The display surface DD-IS may include an area overlapping the flat portion WPL of the window WD and areas overlapping the edge portions WEG. Hereinafter, the area of the display device DD that overlaps the flat portion WPL is defined as a flat area DD-P, and the areas of the display device DD that overlap the edge portions WEG are defined as curved areas DD-C.

The flat area DD-P is parallel to a plane defined by the first direction DR1 and the second direction DR2 perpendicular to the first direction DR1. The curved areas DD-C may extend from opposite sides of the flat area DD-P and may have a curved outer surface. The display device DD may display the image IM on the flat area DD-P and the curved areas DD-EG.

The display device DD may include a display module DM. The display module DM will be described below with reference to FIG. 8.

Figure 8:
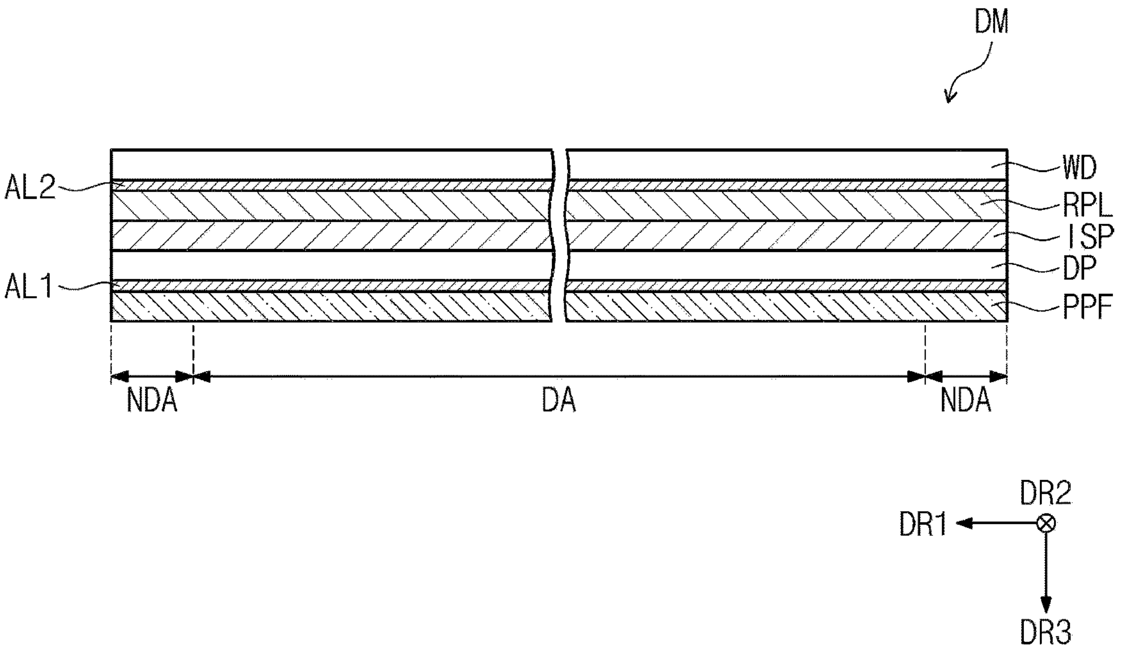
FIG. 8 is a sectional view taken along the line III-III' illustrated in FIG. 7.

FIG. 8 is a sectional view taken along the line III-III' in FIG. 7.

Referring to FIG. 8, the display module DM may be included in the display device DD shown in FIG. 7. The display module DM may include a display panel DP, an input sensing part ISP, an anti-reflection layer RPL, the window WD, a panel protection film PPF, and first and second adhesive layers AL1 and AL2.

The display panel DP may be a flexible display panel. The display panel DP, according to an embodiment of the present disclosure, may be an emissive display panel but is not particularly limited. For example, the display panel DP may be an organic light emitting display panel or an inorganic light emitting display panel. An emissive layer of the organic light emitting display panel may include an organic light emitting material. An emissive layer of the inorganic light emitting display panel may include quantum dots, quantum rods, and the like. Hereinafter, the display panel DP will be described as being an organic light emitting display panel, but this is only an example.

The input sensing part ISP may be disposed on the display panel DP. The input sensing part ISP may include a plurality of sensing parts for sensing an external input in a capacitive manner. The input sensing part ISP may be directly manufactured on (e.g., may be formed on) the display panel DP when the display device DD is manufactured. However, without being limited thereto, the input sensing part ISP may be manufactured as a panel separate from the display panel DP and may be attached to the display panel DP by an adhesive layer.

The anti-reflection layer RPL may be disposed on the input sensing part ISP. The anti-reflection layer RPL may be directly manufactured on the input sensing part ISP when the display device DD is manufactured. However, without being limited thereto, the anti-reflection layer RPL may be manufactured as a separate panel and may be attached to the input sensing layer ISP by an adhesive layer.

The anti-reflection layer RPL may be defined as a film for preventing reflection of external light. The anti-reflection layer RPL may decrease the reflectivity of external light incident toward (or on) the display panel DP from above the display device DD. Due to the anti-reflection layer RPL, the external light may not be visible to a user.

The window WD may be disposed on the anti-reflection layer RPL. The window WD may protect the display panel DP, the input sensing part ISP, and the anti-reflection layer RPL from external scratches and impacts.

The panel protection film PPF may be disposed under the display panel DP. The panel protection film PPF may protect the bottom of the display panel DP. The panel protection film PPF may include a flexible plastic material, such as polyethylene terephthalate (PET).

The first adhesive layer AL1 may be disposed between the display panel DP and the panel protection film PPF, and the display panel DP and the panel protection film PPF may be bonded to each other by the first adhesive layer AL1. The second adhesive layer AL2 may be disposed between the window WD and the anti-reflection layer RPL, and the window WD and the anti-reflection layer RPL may be bonded to each other by the second adhesive layer AL2.

Figure 9:
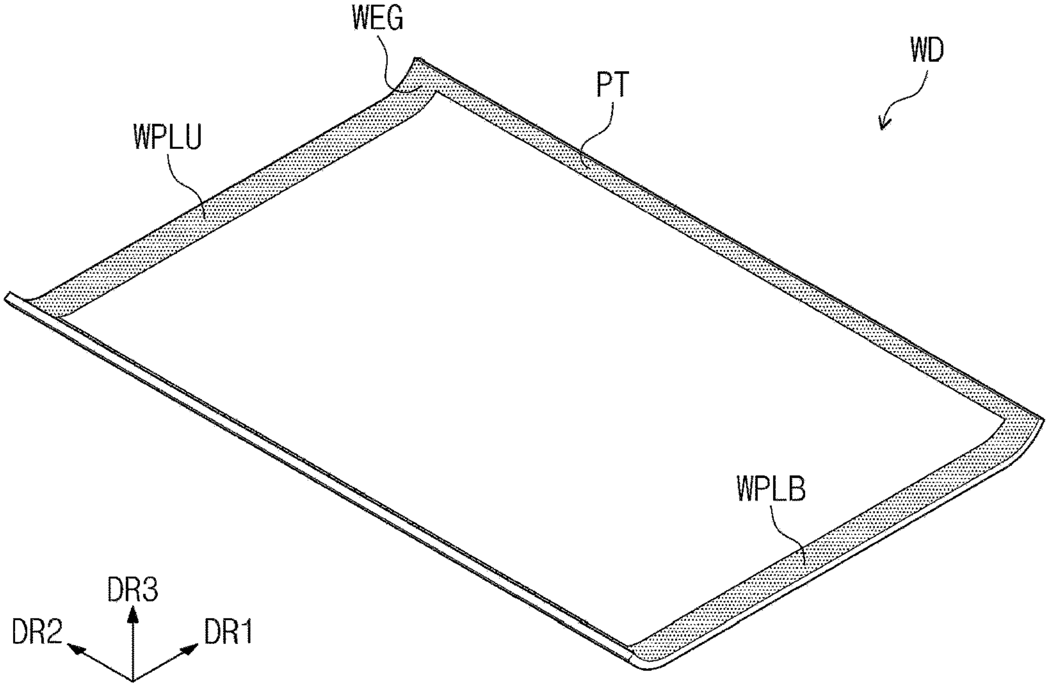
FIG. 9 is a perspective view illustrating the window shown in FIG. 8.

FIG. 9 is a perspective view illustrating the window WD shown in FIG. 8.

Referring to FIGS. 7 and 9, the patterns PT extending in the second direction DR2 may be formed on the edge portions WEG of the window WD. The patterns PT may be formed on the upper flat portion WPLU and the lower flat portion WPLB of the flat portion WPL of the window WD that are symmetrical to each other in the second direction DR2 and overlap the non-display area DD-NDA. The patterns PT formed on the upper flat portion WPLU and the lower flat portion WPLB may extend in the first direction DR1. The patterns PT formed on the edge portions WEG, the upper flat portion WPLU, and the lower flat portion WPLB may surround (e.g., may extend around) part of the flat portion WPL that overlaps the display area DD-DA.

According to embodiments of the present disclosure, when the pad transfers ink to edge portions of a window, the ink may not be provided to the guide pins that fix the window, and thus, residual ink may not remain on the guide pins. Accordingly, when a window to be printed next (e.g., when a subsequent window) is disposed in the jig recess, residual ink may not adhere to the window because there is no ink on the guide pins. As a result, a process for removing residual ink may not be required, and because residual ink is not present to adhere to the window, a defect in the window may be reduced or avoided.

While the present disclosure has been described with reference to embodiments thereof, it will be apparent to those of ordinary skill in the art that various changes and modifications may be made thereto without departing from the spirit and scope of the present disclosure as set forth in the following claims and their equivalents.

What is claimed is:

1. A pad printing device comprising:

a jig body having a jig recess in an upper surface thereof, the jig recess configured to accommodate a window;

a pad on the jig body; and a plurality of guide pins on side portions of the jig body and configured to reciprocate through the side portions into and out of the jig recess.

2. The pad printing device of claim 1, wherein at least one of the guide pins is on a first surface of opposite surfaces of the jig body that face away from each other in a first direction.

3. The pad printing device of claim 2, wherein the remaining ones of the guide pins are on a second surface of opposite surfaces of the jig body that face away from each other in a second direction crossing the first direction.

4. The pad printing device of claim 1, wherein the jig body comprises:

a bottom portion; and a plurality of sidewall portions extending upwardly from a periphery of the bottom portion to define a frame shape, and wherein the jig recess is defined by the bottom portion and the plurality of sidewall portions.

5. The pad printing device of claim 4, wherein a plurality of guide recesses in which the guide pins are arranged are formed in at least some of the sidewall portions, and wherein the guide pins are configured to reciprocate along the corresponding guide recesses.

6. The pad printing device of claim 5, wherein each of the guide pins comprises:

a first portion in a corresponding a guide recess from among the guide recesses; and a second portion connected to the first portion and extending outside the corresponding one of the sidewall portions, and wherein the second portion is configured to reciprocate the first portion.

7. The pad printing device of claim 5, wherein the guide pins protrude further into the jig body than the corresponding sidewall portions.

8. The pad printing device of claim 7, wherein the plurality of guide pins protrude into the jig body to contact the window accommodated in the jig recess.

9. The pad printing device of claim 8, wherein a vacuum absorption hole is defined in the bottom portion, and wherein, when a vacuum is applied to the vacuum absorption hole, the window is fixed to the jig recess.

10. The pad printing device of claim 9, wherein, when the window is fixed to the jig recess by the vacuum absorption hole, the plurality of guide pins are configured to move to the same plane as inside surfaces of the corresponding sidewall portions that face each other.

11. The pad printing device of claim 4, wherein inside surfaces of the side portions that face each other have an inclined surface forming an obtuse angle with the bottom portion, and wherein the window contacts the bottom portion and the inside surfaces.

12. The pad printing device of claim 11, wherein the window has:

a flat portion contacting the bottom portion; and edge portions contacting the inside surfaces, and wherein the edge portions and the inside surfaces have a curved shape.

13. The pad printing device of claim 12, wherein the pad is configured to transfer ink to the edge portions and to not provide ink to the guide pins.

14. A window printing method comprising:

placing a window in a jig recess defined in an upper surface of a jig body, the window having a flat portion and edge portions extending from opposite sides of the flat portion and having a curved surface;

bringing a plurality of guide pins into contact with one of the edge portions, the plurality of guide pins being arranged on side surfaces of the jig body and configured to reciprocate through the side surfaces into and out of the jig recess;

fixing the window by applying a vacuum to a vacuum absorption hole defined in a portion of the jig body at where the jig recess is defined;

spacing the plurality of guide pins apart from the one edge portion;

placing a pad on the window; and providing ink to the edge portions.

15. The window printing method of claim 14, wherein the jig body comprises:

a bottom portion; and a plurality of sidewall portions extending upwardly from a periphery of the bottom portion to define a frame shape, and wherein the jig recess is defined by the bottom portion and the sidewall portions.

16. The window printing method of claim 15, wherein the plurality of guide pins protrude further into the jig body than the sidewall portions to contact the one edge portion, wherein the edge portions extend from opposite sides of the flat portion that face away from each other in a first direction, and wherein the plurality of guide pins fix the window in the first direction.

17. The window printing method of claim 16, wherein the vacuum absorption hole is defined in the bottom portion, and wherein, when a vacuum is applied the vacuum absorption hole, the window is fixed to the jig recess.

18. The window printing method of claim 17, wherein, when the window is fixed to the jig recess by the vacuum absorption hole, the plurality of guide pins move to the same plane as inside surfaces of the sidewall portions that face each other.

19. The window printing method of claim 14, wherein the providing of the ink to the edge portions comprises providing the ink supplied from the outside through the pad to the edge portions.

20. The window printing method of claim 19, wherein, when the ink is provided to the edge portions, the ink is not provided to the plurality of guide pins.

* * * * *